United States Patent [19]
Hausberg et al.

[11] 3,773,472
[45] Nov. 20, 1973

[54] APPARATUS FOR REMOVING SULPHUR OXIDES FROM INDUSTRIAL WASTE GAS

[75] Inventors: Gerhard Hausberg, Essen-Bredeney; Georg Krüger, Lunen; Karl-Martin Bentgraf, Essen, all of Germany

[73] Assignee: Firma L. Bischoff Bau kompletter Gasreinigungsund Wasserruckkuhlanlagen KG, Essen, Germany

[22] Filed: Feb. 23, 1972

[21] Appl. No.: 118,098

Related U.S. Application Data

[62] Division of Ser. No. 813,133, April 3, 1969, abandoned.

[30] Foreign Application Priority Data
Apr. 6, 1968  Germany............... P 17 69 125.7

[52] U.S. Cl.............. 23/283, 23/260, 261/DIG. 54, 423/215, 423/242
[51] Int. Cl........ B01d 47/00, B03c 3/00, B01j 1/00
[58] Field of Search............... 23/283, 260, 2 SQ, 23/2 R; 261/DIG. 9, DIG. 54; 55/223

[56] References Cited
UNITED STATES PATENTS

| | | | |
|---|---|---|---|
| 3,533,748 | 10/1970 | Finfer et al. | 23/178 X |
| 3,421,315 | 1/1969 | Aoi | 55/DIG. 30 |
| 2,142,406 | 1/1939 | Nonbebel et al. | 23/260 |
| 2,740,693 | 4/1956 | Pomykala | 23/220 |
| 3,199,267 | 8/1965 | Hausberg | 261/DIG. 54 |
| 3,439,724 | 4/1969 | Mason | 423/215 X |

FOREIGN PATENTS OR APPLICATIONS
337,436  11/1930  Great Britain............... 23/2 SQ

OTHER PUBLICATIONS
W. P. Jones, "Development of the Venturi Scrubber," Industrial and Engineering Chemistry, Vol. 41, No. 11, p. 2424–2427, Nov. 1949.

*Primary Examiner*—Joseph Scovronek
*Attorney*—Karl F. Ross

[57] ABSTRACT

An industrial waste gas containing sulphur oxides is admixed with an alkaline powder (or contains finely-divided particles of solids from the furnace) and is saturated with a wash liquid consisting primarily of water admixed with an alkali or alkaline salt. Then the saturated gas is adiabatically and continuously expanded to precipitate the wash liquid around the powder particles. The precipitated droplets are collected from the cleansed gas and, if desired, recirculated as wash liquid after sedimentation of solids. The gas and wash liquid are passed through a venturi clearance around a body above which a cold-water spray is provided.

2 Claims, 2 Drawing Figures

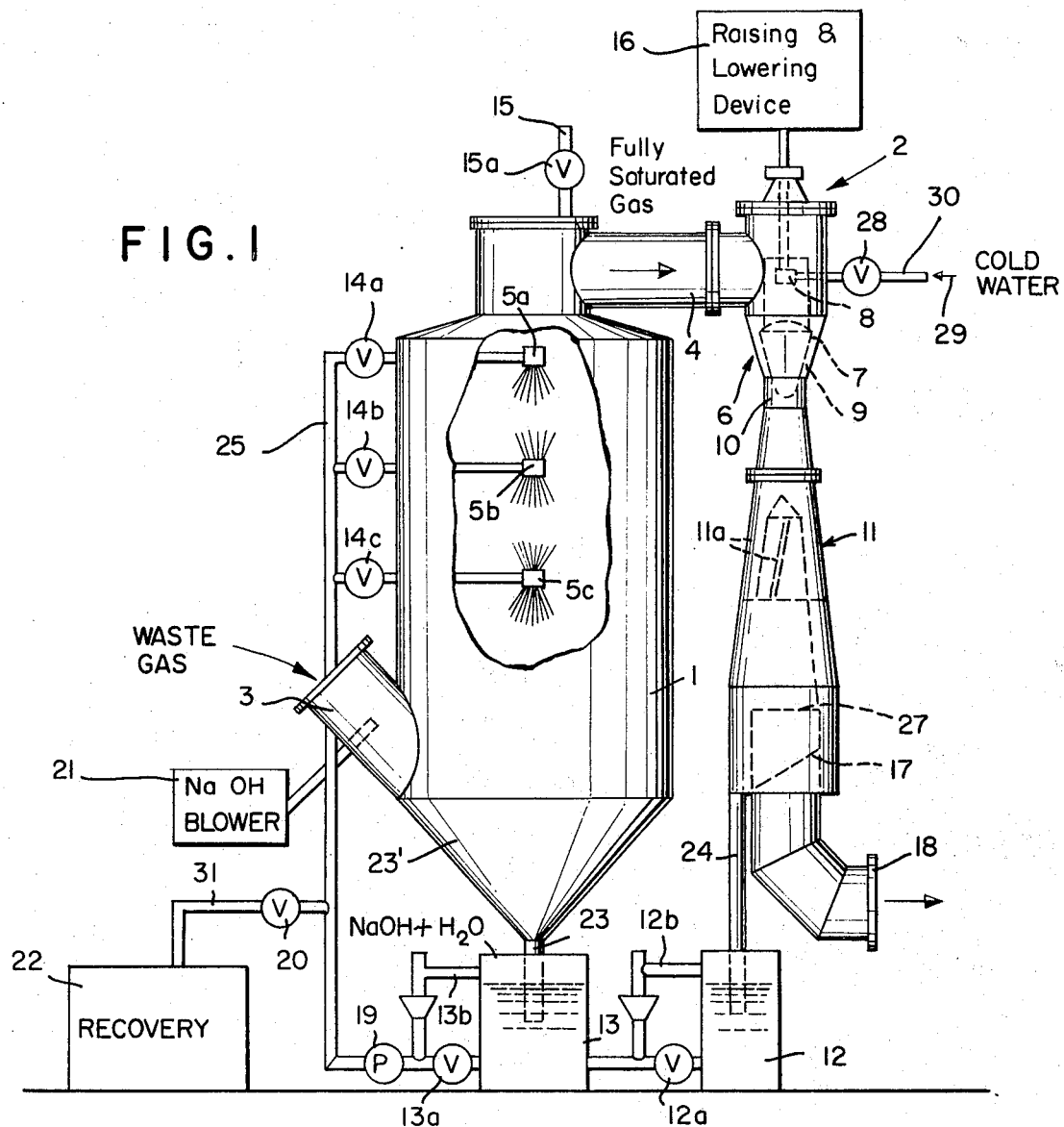
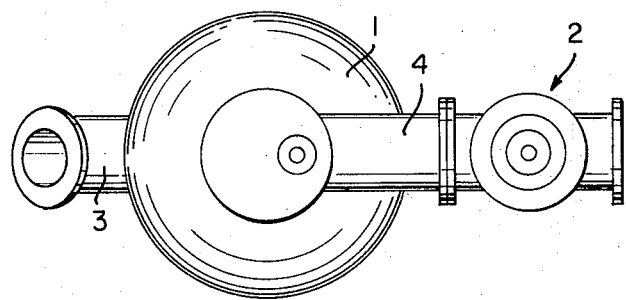

APPARATUS FOR REMOVING SULPHUR OXIDES FROM INDUSTRIAL WASTE GAS

This application is a division of application Ser. No. 813,133 filed Apr. 3, 1969 now abandoned.

Our present invention relates to an apparatus for removing sulphur oxides from industrial waste gas, particularly waste gas from steel-making furnaces or smelting plants, ore-roasting furnaces, industrial heating plants using low-quality or sulfurous fuels, etc.

It is well known that oxides of sulphur, particularly sulphur dioxide and sulphur trioxide, present a great air-pollution problem. Many industrial processes, e.g., the production of iron or steel, generate waste gases rich in these pollutants, which form corrosive acids upon contact with moisture and are noxious to humans, animal life and plant life.

An important prior-art method of removing such sulphur compounds has been to pass the waste gas through a filter of activated carbon or some similar adsorbent. Such a method is expensive since it requires the discarding or regeneration of the filter, and since it causes a substantial pressure drop in the gas being treated, thereby creating difficulties in reuse for some further smelting process, interfering with furnace draft, and requiring additional means to displace the gas. Furthermore, such methods are not highly efficient in that they do not remove sufficient proportions of the sulphur oxides.

It is an object of our present invention to provide an improved apparatus for removing sulphur oxides from industrial waste gases of the character described.

We attain the above and other objects, which will become apparent hereinafter, in accordance with the present invention by a system which is based upon our surprising discovery that, when a sulphur-oxide-containing gas stream, which also contains the finely divided solids normally present in the waste gases of metallurgical furnaces (carbon black, condensed iron, iron oxides, silica, etc.), is saturated with water vapor without filtration of the particles therefrom (and, if the gas contains no such particles or such particles are completely removed during the saturation with water vapor, additional particles are supplied), an adiabatic condensation can be carried out with the saturated gas (e.g., by continuously passing the saturated gas through a constriction and then allowing the gas to expand on the downstream side of the constriction) whereby water droplets are precipitated about nuclei constituted by the particles and also take up substantially all of the sulphur oxides so that the treated gas is substantially completely freed therefrom. While we do not fully understand why the interplay of the nuclei or seed particles (of a particle size of the order of microns), the saturation of the gas without prior filtration of the particles therefrom, and the subsequent adiabatic condensation of water vapor will strip a greater proportion of the sulphur oxides from the gas stream than earlier washing methods using impingement baffles, alkaline wash towers and adsorption techniques, the surprising fact is that a simple apparatus for carrying out the above-described method yields sharply better results than ordinary wash towers of greater contact time and capacity.

Thus, in accordance with a feature of our invention, we first pass the waste gas countercurrent to a very finely divided spray of water to saturate it thoroughly and then the vaporized spray is adiabatically condensed for removal from the gas. We have found that such a condensate generally entrains a very great percentage, if not all, of the sulphur oxides.

According to another feature of our ivention, an alkaline powder (of a particle size of the order of microns) such as sodium hydroxide is added to the waste gas and each particle ultimately acts as the nucleus of a droplet of condensate, while eventually reacting with the sulphur oxides in the droplet in a neutralization reaction. An alkaline or saline solution can be used for the spray to promote absorption and neutralization of $SO_2$ and $SO_3$. In addition, the naturally occurring dust particles, which may mainly be iron oxides, in the waste gas can be counted on to provide a nucleus or seed around which much condensation can occur.

The adiabatic compression and subsequent decompression used to precipitate the sulphur-carrying water in the saturated waste gas makes use of a Venturi body placed in the path of the gas and forming the constriction mentioned earlier. An impingement-baffle separator downstream of the Venturi body serves to collect the condensate from the gas. Further spraying of water into the gas adjacent the condensing zone also aids the separation of the condensate; the Venturi body and the additional spray head may form an annular-gap gas washer.

Yet another feature of our invention provides that the whole process is carried out in a relatively closed system thereby not greatly depressurizing the waste gas so that it can be reused if desired.

A further feature provides for the use of a seed and/or neutralizing compound which reacts with the sulphur oxides but is substantially nonreactive with the carbon dioxide in the gas.

Such a an apparatus thoroughly rids the waste gas of sulphur oxides. In addition, it requires little energy and, therefore, operating expense, and does not greatly inhibit the further use of the cleansed gas.

The above and other objects, features, and advantages of our present invention will be more fully described hereinafter with reference to the accompanying drawing in which:

FIG. 1 is a vertical section through an apparatus for carrying out the method of our invention; and FIG. 2 is a top view of the apparatus shown in FIG. 1.

As shown in FIGS. 1 and 2 our apparatus includes a tower 1 for saturating waste gas and a condenser 2 for removing the absorbed liquid.

The tower 1 has a downwardly inclined inlet 3 at its base for waste gas and an outlet 4 at the top for the gas which is saturated by very fine conical sprays of water or an aqueous alkaline solution of pH>7 from axially spaced but aligned spray nozzles 5a, 5b, 5c jointly connected to a pipe 25 by respective valves 14a, 14b, 14c. These nozzles are so-called rotary-spray or centrifugal nozzles as described, for example, in U.S. Pat. No. 3,140,163. A valve 15a and a pipe 15 are arranged on the horizontal outlet 4 for sampling the gas there. Wash liquid not absorbed by the waste gas is collected by a funnel 23' below the base of the tower and passes through a drain 23 into a settling tank or reservoir 13.

The condenser 2 consists of a somewhat J-shaped conduit 6 having a restricted neck 10 in which a Venturi body 7 is received. A raising and lowering device 16, as for example a simple screw arrangement, is provided to vary the width of a clearance 9 between the body 7 and the walls of the conduit 6. Below and downstream of the Venturi body 7 is a uniflow cyclone separator as described on page 20–73 of Perry's Chemical Engineers'Handbook (McGraw-Hill: 1963) with swirl vanes 11a or an impingement-baffle separator. Further downstream is a conduit 27 around which an inclined baffle 17 extends. The conduit 27 has an outlet 18, and condensate collects in a settling tank 12 after running off the baffle 17 and through a pipe 24. A nozzle 8 similar to nozzles 5a–5c sprays cold water from a supply 29 passing through a pipe 30 and valve 28 into the conduit 6 just above the Venturi body 7 to cool the gas and further aid condensation and precipitation. Members 6–8 define an annular gap for the passage of gas and water.

The reservoirs 12 and 13 have respective upper runoff pipes 12b and 13b and lower drain valves 12a and 13a all connected through a pump 19 and a pipe 25 to the nozzles 5a–5c. Furthermore, a second pipe 31 and valve 20 empty into a recovery apparatus 22.

A blower 21 introduces highly comminuted dry sodium hydroxide or sodium carbonate into the inlet 3 through a pipe 26 to inject the seed particles or nuclei into the gas stream if necessary.

Our apparatus operates as follows:

Hot waste gas under pressure, consisting mainly of $SO_2$, $SO_3$, CO, $H_2O$ and $CO_2$ and carrying a small amount of iron condensate, iron-oxide dust and other solids, is introduced at inlet 3 where it is admixed with a quantity of powdered sodium hydroxide (or sodium carbonate) from the pipe 26. As the gas-dust mixture rises in the tower 1 it is sprayed by nozzles 5a–5c and completely saturated with a wash liquid consisting of large amounts of water in which sodium hydroxide is dissolved. Thence it passes out through the outlet 4 and descends the conduit 10 where it is sprayed by the cold water from the nozzle 8 and then passes around the Venturi body 7; upon expansion the wash liquid precipitates out in droplets. These droplets form around the particles of dust and NaOH in the gas. Then, as the mixture is caused to spin by the cyclone 11, the droplets strike the inside of the conduit 10 and run down to the baffle 17 and out the pipe 24.

The wash liquid can be recirculated from the reservoirs 12 and 13 until it is no longer usable, being then channeled off into the recovery apparatus 22 where any of its useful constituents can be removed.

We claim:

1. An apparatus for removing sulphur oxide from a waste gas containing sulphur oxides together with finely divided particles, said apparatus comprising:

an upright wash tower having inlet means at its base for introducing said gas thereinto and outlet means at its top for removing said gas;

nozzle means in said tower for treating the gas with a wash liquid to saturate same with water vapor and means in said tower for adding a finely divided solid to said gas;

a substantially J-shaped conduit connected at one end to said outlet means;

condensing means including a body forming a Venturi constriction in said conduit for continuously precipitating the water vapor from the gas in droplets around the particles as the gas is passed in a stream through said conduit, and spray means adjacent said body and thereabove for injecting cold water into said conduit; and collecting means in the conduit for separating the precipitated droplets from the gas, said condensing means being located upstream of and above said collecting means.

2. The apparutus defined in claim 1, further comprising drain means for collecting wash liquid in said tower not entrained in a vapor state, said collecting means including a settling tank for separating particles stripped from said gas by said wash liquid.

* * * * *